United States Patent [19]
Helling

[11] Patent Number: 5,888,719
[45] Date of Patent: Mar. 30, 1999

[54] COLOR PHOTOGRAPHIC SILVER HALIDE MATERIAL

[75] Inventor: Günter Helling, Odenthal, Germany

[73] Assignee: AGFA-Gevaert AG, Germany

[21] Appl. No.: 681,815

[22] Filed: Jul. 29, 1996

[30] Foreign Application Priority Data

Aug. 2, 1995 [DE] Germany .................. 195 28 307.4
Feb. 22, 1996 [DE] Germany .................. 196 06 596.8

[51] Int. Cl.$^6$ .................. G03C 1/005; G03C 1/494
[52] U.S. Cl. .................. 430/627; 430/546; 430/629; 430/630; 430/634; 430/636; 430/637; 430/638; 430/531; 430/536; 430/545; 430/551
[58] Field of Search .................. 430/551, 545, 430/546, 627, 629, 630, 634, 637, 636, 638, 531, 536

[56] References Cited

U.S. PATENT DOCUMENTS

| | | | |
|---|---|---|---|
| 4,323,644 | 4/1982 | Nakamura et al. | 430/627 |
| 4,756,998 | 7/1988 | Helling et al. | 430/627 |
| 4,987,061 | 1/1991 | Helling et al. | 430/531 |
| 5,085,981 | 2/1992 | Himmelmann et al. | 430/536 |

FOREIGN PATENT DOCUMENTS 0 226 120 B1  2/1986  European Pat. Off. .
0343642A2  11/1989  European Pat. Off. .

Primary Examiner—Geraldine Letscher
Attorney, Agent, or Firm—Connolly & Hute

[57] ABSTRACT

A color photographic material with a support and at least one spectrally sensitised silver halide emulsion layer containing at least one color coupler, which layer contains a polymer with repeat units of the structure I

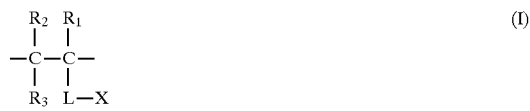

in which $R_1$, $R_2$, $R_3$ are identical or different and mean hydrogen, alkyl or halogen, L means a chemical bond or a linking member and X means a group which reacts with $NH_2$—, COOH— or OH— groups in an addition or condensation reaction, in dispersed form with an average particle size of <300 nm, is distinguished by improved "dark fading" stability.

2 Claims, No Drawings

COLOR PHOTOGRAPHIC SILVER HALIDE MATERIAL

This invention relates to a colour photographic silver halide material with a support and at least one spectrally sensitised silver halide emulsion layer which contains a reactive polymer in dispersed form with a particle size of <300 nm.

The material is distinguished by better stability of the image dye produced by exposure and processing, in particular the cyan dyes on storage in the dark (so-called "dark fading stability").

Colour photographic materials often exhibit the deficiency that, after exposure and processing, the image dyes produced from the colour couplers and developer oxidation product, in particular the cyan dyes, bleach in the dark.

The object of the invention is to eliminate or at least reduce this deficiency. This is achieved by using reactive polymers in a certain form in the layer concerned.

Polymers with reactive groups are taken to be polymers having reactive groups which may react with $NH_2$—, COOH— or OH— groups in an addition or condensation reaction at 20° to 80° C. and pH 3 to 11.

The present invention thus provides a colour photographic material with a support and at least one spectrally sensitised silver halide emulsion layer containing at least one colour coupler, characterised in that this silver halide emulsion layer contains a polymer with repeat units of the structure I

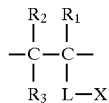
(I)

in which $R_1$, $R_2$, $R_3$ are identical or different and mean hydrogen, alkyl or halogen, L means a chemical bond or a linking member and X means a group which reacts with $NH_2$—, COOH— or OH— groups in an addition or condensation reaction, in dispersed form with an average particle size (diameter of spherical particles or diameter of a sphere of identical volume in the case of particles which are not exactly spherical) of <300 nm.

The polymers are known from EP 226 120 B1 and are used therein in protective layers to improve mechanical properties.

It has surprisingly now been found that, in silver halide emulsion layers, they improve dark fading stability.

Suitable reactive groups X are

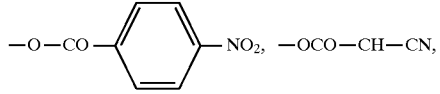

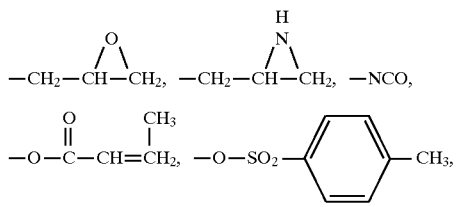

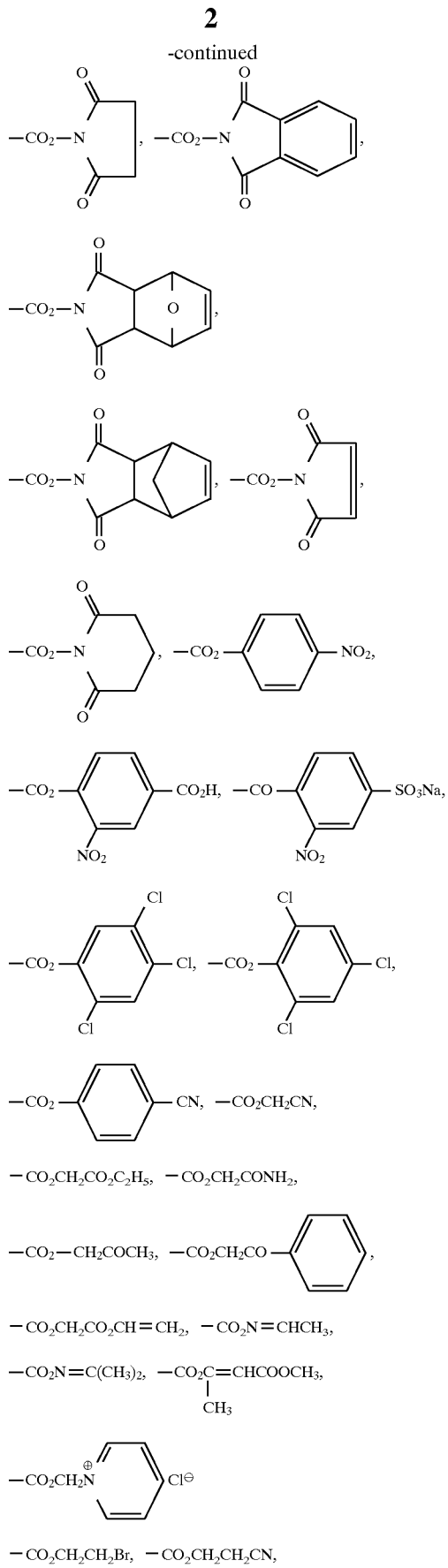

-continued

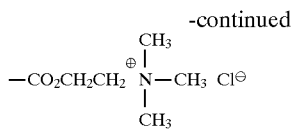

wherein

R⁴ means alkyl, aryl, aralkyl.

X preferably means Cl or

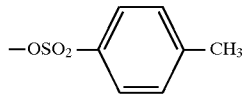

Suitable linking members L are

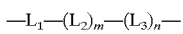

wherein X is attached to L₃ and

L₁ means a —CONH—, —COO—, —CO— or a phenylene group,

L₂ means an alkylene group with 1 to 20 C atoms or an arylene group with 6 to 20 C atoms, L₃ means a —COO—, —OCO—, —CONH—, —NH—CO—O—, —NHCO—, —SO₂NH—, —NHSO₂—, —SO₂— group or —O—, m means 0 or 1 and n in the event that m is 0, also means 0, otherwise 1.

L is preferably

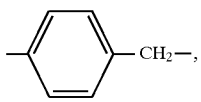

—COO—CH₂—CH₂—OCO—CH₂— or —COO—CH₂—CH₂—, but in particular

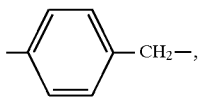

wherein the CH₂ group is attached to X.

The polymers with reactive groups have average molecular weights (weight average) of $10^4$ to $10^7$. In the case of the crosslinked polymers (for example P-9), molecular weight may be greater than $10^7$. Stating molecular weight makes no sense in this case.

The polymerisable monomers underlying the repeat units of the formula I may be homo- or preferably copolymerised, wherein they preferably constitute 5 to 50 mol-% of the monomer mixture to be polymerised.

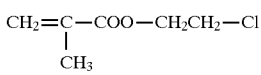

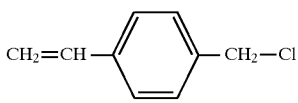

-continued

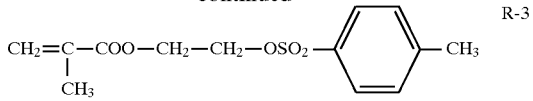

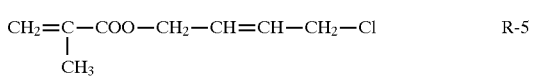

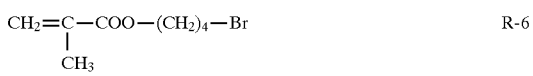

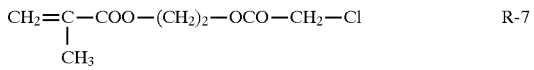

Preferred monomers with reactive groups are

Various comonomers are suitable for production of the copolymers. The copolymers according to the invention may contain one or more comonomers. Examples of comonomers are:

glyceryl methacrylate, N-(m-hydroxyphenyl) methacrylamide, 2-hydroxyethyl acrylate, 2-phenyl-1-vinylimidazole, 2-hydroxypropyl acrylate, N-isopropyl-acrylamide, N-(1,1-dimethyl-3-dimethylaminopropyl)acrylamide, 2-methyl-1-vinylimidazole, 1-vinylimidazole, N-vinyl-ε-caprolactam, p-methanesulphonamidostyrene, N-methylmethacrylamide, methacrylamide, N-(3-oxo-n-butyl)maleimide, maleimide, N-(2-aminoethyl) methacrylamide hydrochloride, 2-hydroxyethyl methacrylate, methacryloylurea, N-(3-aminopropyl) methacrylamide hydrochloride, N-(2-amino-2-methylpropyl)methacrylamide, methacrylic acid salt, acrylonitrile, α-chloroacrylonitrile, methacrylonitrile, N-(2-hydroxypropyl)methacrylamide, N-acryloylpiperidine, N-vinylsuccinimide, N-vinylphthalimide, 2-hydroxypropyl methacrylate, 2-(5-ethyl-2-pyridyl)ethyl acrylate, N-(3-methacryloyloxypropyl)thiourea, N-vinyl-2-pyrrolidone, p-aminostyrene, 2-(N,N-dibutylamino) ethyl acrylate, N-(4-vinylphenyl)thiourea, 3-acrylamido-2-oxotetrahydrothiophene, N-(4-methacryloyloxyphenyl)methanesulphonamide, 1,1-dicyano-4-[N-(t-butyl)-N-(2-methacryloyloxyethylamino]-1,3-butadiene, N-(p-sulphamoylphenyl)maleimide, N-methacryloyl-p-toluenesulphonamide, N-(4-vinylphenyl)-N'-methylthiourea, 2-acrylamido-2-hydroxymethyl-1,3-propanediol, N,N-dimethylmethacrylamide, N-methylacrylamide, 2-ureidoethyl vinyl ether, N-methacryloyl-N'-ureidoacetylhydrazine, N-vinyl-N'-(2-hydroxyethyl)succinamide, 2-methyl-5-vinylpyridine, N-vinyl-N'-(2-amino-2-methylpropyl) succinamide, N-vinylcarbazole, 2-vinylpyridine, 4-vinylpyridine, N-isopropylmethacrylamide, N,N-dimethylacrylamide, 2-(2-chloro-4,6-dimethylphenyl)-5-acrylamidopyrazolin-3-one, 2-(diethylamino)ethyl acrylate, 3,6-dimethyl-3,6-diazoheptyl acrylate, 2-(dimethylamino)ethyl acrylate, 2-(dimethyl-amino) ethyl methacrylate, 2-(diethylamino)ethyl methacrylate, 3-[3-(dimethylamino)-propyl] acrylamide, acrylamide, N-(3-methyl-5-oxo-3-heptyl) acrylamide, N-(2-methyl-4-oxo-2-pentyl)acrylamide, N-methyl-2-aminoethyl methacrylate hydrochloride, allyl alcohol, N-acryloylmethionine methyl ester, N-methylolacrylamide, N-(3- or 5-hydroxymethyl-2-methyl-4-oxo-2-pentyl)acrylamide, bis(1-dimethylaminoethyl)methyl methacrylate, N-(isobutoxymethyl)acrylamide, N-(isobutoxymethyl)methacrylamide, N-(m- and p-vinylbenzyl)-N,N-dimethylamine, m- and p-vinylbenzyl alcohol, 2-poly(ethyleneoxy)ethyl acrylate, ethylacrylamido acetate, methacryloyloxypolyglycerol, 2-(t-butylamino)ethyl methacrylate, 3-[2-dimethylamino)ethyl]acrylamide, 3-[2-(dimethylamino)ethyl]methacrylamide, 3-(diethylamino)propyl acrylate, 4-(diethylamino)-1-methylbutyl acrylate, 4-[N-(2-acryloyloxyethyl)-N-ethylamino]-1,1- dicyano-1,3-butadiene, 1,1-dicyano-4-[N-(1,1-dimethylethyl)-N-(2-methacryloyloxyethyl)amino]-1,3-butadiene, 1,1-dicyano-4-([N-(1-dimethylethyl)-N(2-methacryloyloxyethylcarbamoylethyl)amino]-1,3-butadiene, N,N-diethyl-5-(m- and p-vinylphenyl)-3-ketopentanoylamide, t-pentyl acrylate, n-pentyl acrylate, 3-pentyl acrylate, n-butyl acrylate, benzyl acrylate, t-butyl methacrylate, 5-methyl-1,3,6-heptatriene, 1,1-dihydroperfluorobutyl acrylate, di-n-butyl-α-methylene glutarate, benzyl methacrylate, 3-oxo-n-butyl acrylate, t-butyl acrylate, cyclohexyl acrylate, cyclopentyl acrylate, cetyl acrylate, cyclohexyl methacrylate, cyclopentadiene, butadiene, 2-norbornylmethyl acrylate, 2-(p-toluene-sulphonyloxy)ethyl acrylate, trans-1,2-dichloroethylene, 2-norbornylmethyl methacrylate, diethylmethacryloyl malonate, dimethyl-α-methylene glutarate, ethyl methacrylate, ethylene, p-chlorostyrene, vinylthio(methylthio)methane, 1-vinylthio-4-methylthiobutane, isobutyl acrylate, ethyl-N-acryloylglycine, ethyl-5-(m- and p-vinylphenyl)-3-ketopentanoate, methyl-5-(m- and p-vinylphenyl)-3-ketopentanoate, N-(3,6-dithiaheptyl)acrylamide, 2-ethylhexyl acrylate, bis(cyclohexylmethyl)-α-methylene glutarate, n-hexyl methacrylate, 3-ethyl-1-methylbutyl acrylate, N-(3,6-dithiaoctyl) acrylate, 2-ethylhexyl methacrylate, 2-isobornyl methacrylate, 6-(m- and p-vinylphenyl)-2,4-hexanedione, diisobutyl-α-methylene glutarate, chloroprene, bis-(2-thiabutyl)methyl acrylate, n-butyl methacrylate, isobutyl methacrylate, 3-oxo-n-butyl methacrylate, isopropyl methacrylate, t-butyl-5-(m- and p-vinylphenyl)-3-ketopentanoate, lauryl acrylate, lauryl methacrylate, methyl acrylate, methyl α-chloroacrylate, methyl methacrylate, methyl vinyl ketone, 3-methyl-2-nitropropyl acrylate, 2-(3-nortricyclylmercapto)ethyl methacrylate, 1-vinylthio-3-methylthiopropane, 5-norbornen-2-yl-methyl methacrylate, N-(1,1-dimethyl-3-methylthiopropyl)acrylamide, 2-methyl-2-nitropropyl methacrylate, 5- (or 6-)methylmercapto-2-norbornylmethyl methacrylate, 3,7-dithio-1-octene, 3-methyl-2-norbornylmethyl methacrylate, 4-methyl-2-propylpentyl acrylate, n-octyl acrylate, n-octadecyl acrylate, n-octadecyl methacrylate, 2-ethoxyethyl acrylate, 2-ethoxyethyl methacrylate, n-octyl methacrylate, 2-methoxyethyl methacrylate, 2-methoxyethyl acrylate, 2-methoxymethoxyethyl acrylate, 1,3,6-octanene, ethyl acrylate, propyl acrylate, 2-cyanoethyl acrylate, dicyclopentenyl acrylate, 2,2,2-trifluoroethyl acrylate, phenyl acrylate, isopropyl acrylate, n-propyl methacrylate, N-(1,1-dimethyl-3-ethylthiopropyl)acrylamide, N-(3-thiabutyl)acrylamide, N-(3-thiaheptyl)acrylamide, 2,5-dichlorostyrene, N-[2-(4-t-butylphenylthio)ethyl]-acrylamide, N-(2-phenylthioethyl)acrylamide, N-[2-(p-tolylthio)ethyl]acrylamide, n-hexyl acrylate, N-(1,1-dimethyl-2-methylthioethyl)acrylamide, 2-methacryloyloxyethyl tosylate, N-(3-thiabutyl)methacrylamide, styrene, N-[2,2-bis(ethylthio)ethyl]acrylamide, sec.butyl acrylate, p-bromostyrene, o-chlorostyrene, p-fluorostyrene, m-chlorostyrene, p-t-butylstyrene, m- and p-(2-thiapropyl)styrene, 2-(methylsulphinyl)ethyl acrylate, 2-(ethylsulphinyl)ethyl acrylate, trichloroethylene, 2,2-dimethylbutyl acrylate, neohexyl acrylate, 3-thiapentyl acrylate, N-(3-thiapentyl)methacrylamide, 3-thiapentyl methacrylate, N-(3-thiapentyl)acrylamide, N-t-butylacrylamide, vinyl acetate, vinyl bromide, butyl vinyl ether, vinylidene bromide, vinyl chloride, vinyl ethyl thioacetate, vinyl isobutyrate, vinyl chloroacetate, vinyl 2-ethylhexanoate, m- and p-vinyltoluene, 1-bromo-1-chloroethylene, vinyl neodecanoate, 3,4-dichlorostyrene, dimethyl-2-methyl-1,3-butadienyl phosphate, dimethyl-1-propen-2-yl phosphate, α-methylstyrene, methacryloyloxyethyl trifluoroacetate, N-phenylmaleimide, N-(p-chlorophenyl)maleimide, methyl vinyl ether, 2-(methoxymethoxy)ethyl acrylate, methyl p-styrenesulphonate, ethyl o- and p-styrenesulphonate, vinylbenzyl acetate, vinyl benzoate, 4-acryloyloxybutane-1-sulphonic acid Na salt, 3-acryloyloxy-1-methylpropane-1-sulphonic acid Na salt, acrylic acid, citraconic acid, chlorofumaric acid, monomethyl-α-methylene glutarate, 3-allyloxy-2-hydroxypropanesulphonic acid Na salt, α-chloroacrylic acid, β-acryloyloxypropionic acid, β-acryloyloxyethyl monophosphate, potassium 3-acryloyloxypropyl phosphate, potassium 2-acryloyloxyethyl phosphate, mono-(3-acryloyloxypropyl) phosphate, 4-t-butyl-9-methyl-8-oxo-7-oxo-4-aza-9-decene-1-sulphonic acid, methacrylic acid, mono-(2-methacryloyloxyethyl) phosphate, potassium 3-methacryloyloxypropyl phosphate, mono-(3-methacryloyloxypropyl) phosphate, vinylsulphonic acid Na salt, fumaric acid, monoethyl fumarate, monomethyl fumarate, 3-acrylamido-3-methylbutyric acid, monomethyl itaconate, bis-(3-sodiumsulphopropyl) itaconate, itaconic acid, maleic acid, mesaconic acid, α-methyleneglutaric acid, N-(2-amino-2-methylpropyl)maleic acid, 2-acryloyloxyethylsulphuric acid Na salt, 2-methacryloyloxyethylsulphuric acid, N-[4-(2-amino-2-methylpropyl)-1-methylcyclohexyl]maleic acid, pyridinium 2-methacryloyloxyethyl sulphate, crotonic acid, 3-acrylamidopropane-1-sulphonic acid K salt, ammonium (8-methacryloyloxy-3,6-dioxaoctyl) sulphate, p-styrenesulphonic acid Na salt, vinylphenyl-methanesulphonic acid Na salt, 3-methacryloyloxypropane-1-sulphonic acid Na salt, 3-methacryloyloxypropane-1-methylsulphonic acid Na salt, 4-methacryloyloxybutane-1-sulphonic acid Na salt, 2-methacryloyloxyethyl-1-sulphonic acid Na salt, 2-acrylamido-2-methylpropanesulphonic acid Na salt, 3-methacryloyloxypropane-1-sulphonic acid K salt, 3-acryloyloxypropane-1-sulphonic acid Na salt, methacrylic acid Na salt, lithium methacrylate, N-[2-(N-methylsulphonyl-N-potassiosulphamoyl)-ethyl]methacrylamide, N-[2-(N-phenylsulphonylsulphamoyl)ethyl]acrylamide, N-[2-(N-phenylsulphonylsulphamoyl)ethyl]methacrylamide, N-(m- and p-vinylbenzyl)-iminodiacetic acid, monodecyl itaconate, monododecyl itaconate, monotetradecyl itaconate, monohexadecyl itaconate, monohexyl itaconate, monooctyl itaconate, 2-methacryloyloxyethyl-1-sulphonic acid, ammonium p-styrenesulphonate, sodium o- and p-styrenesulphonate, potassium o- and p-styrenesulphonate, monovinyl adipate, 2-acrylamido-2-methylpropanesulphonic acid Na salt, N-(3-acrylamidopropyl)ammonium methacrylate, N-(2-methacryloyloxyethyl)-N,N,N-trimethylammonium iodide, N-(2-methacryloyloxyethyl)-N,N,N-trimethylammonium p-toluenesulphonate, 2-methacryloyloxyethylisothiuronium methanesulphonate, 3-methacryloyloxypropylthiuronium tosylate, 1,2-dimethyl-5-vinylpyridinium methosulphate, N-(2-methacryloyloxyethyl)-N,N,N-trimethylammonium bromide, N-(2-hydroxy-3-methacryloyloxypropyl)-N,N,N-trimethylammonium sulphate, N-(2-hydroxy-3-methacryloyloxypropyl)-N,N,N-trimethylammonium chloride, N-vinylbenzyl-N,N,N-trimethylammonium chloride, N-(3-acrylamido-3,3-dimethylpropyl)-N,N,N-trimethylammonium methosulphate, 3-methyl-1-vinylimidazolium methosulphate, N-(3-methacrylamidopropyl)-N-benzyl-N,N-dimethylammonium chloride, N-(3-methacrylamidopropyl)-N,N,N-trimethylammonium chloride, N-(2-acryloyloxyethyl)-N,N,N-trimethylammonium methosulphate, N-(2-methacryloyloxyethyl)-N,N-dimethyl-N-benzylammonium chloride, 3-(2-methyl-5-vinylpyridino)propyl sulphonate, N,N'-methylenebisacrylamide, ethylene dimethacrylate, 2,2-dimethyl-1,3-propylene diacrylate, divinylbenzene, mono-[2,3-bis(methacryloyloxy)propyl]phosphate, N,N'-bis(methacryloyl)urea, triallyl cyanurate, allyl acrylate, allyl methacrylate, N-alkylmethacrylamide, 4,4'-isopropylidenediphenylene diacrylate, 1,3-butenylene diacrylate, 1,4-cyclohexylenedimethylene dimethacrylate, 2,2'-oxydiethylene dimethacrylate, divinyloxymethane, ethylene diacrylate, ethylidene diacrylate, propylidene dimethacrylate, 1,6-diacrylamidohexane, 1,6-hexamethylene diacrylate, 1,6-hexamethylene dimethacrylate, phenylethylene dimethacrylate, tetramethylene dimethacrylate, 2,2,2-trichloroethylidene dimethacrylate, ethylenebis(oxyethylene) diacrylate, ethylenebis(oxyethylene) dimethacrylate, ethylidyne trimethacrylate, propylidyne triacrylate, vinylallyl oxyacetate, 1-vinyloxy-2-allyloxyethane, 2-crotonoyloxyethyl methacrylate, diallyl phthalate, 2-(5-phenyl-2,4-pentadienoyloxy) ethyl methacrylate, N-allylcyanoacrylamide, ethylmethacryloyl acetoacetate, acryloylacetone, methacryloylacetone, ethylacryloyl acetate, N-(2-acetoacetoxyethyl)acrylamide, 3-methacryloyl-2,4-pentanedione, N-(methacryloyloxyethyl)acetoacetamide, 2-acetoacetoxyethyl methacrylate, N-t-butyl-N-(2-methacryloyloxyethyl)acetoacetamide, 2- and 3-acetoacetoxypropyl acrylate, 2-acetoactoxyethyl acrylate, 2-acetoacetoxy-2-methylpropyl methacrylate, ethylmethacryloyl acetate, N-(3-acetoacetamidopropyl)methacrylamide, N,N-dimethylacryloylacetamide, N-(3-methacryloyloxypropyl)cyanoacetamide, 2-aminoethyl methacrylate, 2-hydroxypropyl methacrylate, 2-methacryloyloxyethyl mesylate, p-aminostyrene, m- and p-(2-chloroethylsulphonylmethyl)styrene, methacrylic acid, acrylic acid, methacrylamide, 3-(N,N-diethylamino)propyl acrylate, vinyl chloroacetate, vinylbenzaldehyde, 2-cinnamoyloxyethyl methacrylate, triallyl isocyanurate, N-(3- and 4-vinylphenyl)-N'-(3-chloropropionyl)urea, N-(3- and 4-vinylphenyl)-3-chloropropionamide, 2-(N-methyl-2-methacryloyloxyethylamino)-4,6-dichloro-s-triazine, N-(2-methacryloyloxyethyl)-N'-(3-chloropropionyl) urea, N-(3-methacrylamidopropyl)-N'-(3-chloropropionyl)urea, N-(3-methacrylamidopropyl)-N'-(2-chloroacetyl)urea, N-[3-(3-chloropropionamido) propyl]methacrylamide m-methacrylamidophenol, m-acrylamidophenol.

Preferred comonomers are of the formula (II)

$$CH_2=\underset{\underset{R_1}{|}}{C}-L_1-[L_2\frac{}{m}+L_3\frac{}{n}Q \qquad (II)$$

in which $R_1$, $L_1$, $L_2$, $L_3$, m and n have the above-stated meaning and

Q is a group which does not react with —$NH_2$, —COOH or —OH, in particular optionally non-reactively substituted alkyl, aryl or aralkyl, or a photographically useful group.

Suitable photographically useful groups are chemical structural units assuming the function of a UV absorber, a filter dye, a mordant, a development inhibitor, a developer, a bleach, a bleach inhibitor, a cyan, magenta or yellow coupler, a white coupler, a wetting agent, a DIR or DAR coupler, a masking coupler. Comonomers with these structures are described in U.S. Pat. No. 5,234,807.

Examples of polymers according to the invention are:

average particle size (nm)

P-1   $(-CH_2-CH\frac{}{90}(-CH_2-CH-)_{10}$           80
      |
      $COOC_4H_9$ 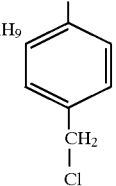

-continued

| | | average particle size (nm) |
|---|---|---|
| P-2 | $(-CH_2-CH\)_{70}(-CH_2-CH\)_{10}(-CH_2-CH-)_{20}$ with $COOC_2H_5$, phenyl, and p-($CH_2Cl$)-phenyl substituents | 120 |
| P-3 | $(-CH_2-CH\)_{80}(-CH_2-C(CH_3)\)_{20}$ with $COOC_3H_7$ and $COO-CH_2CH_2-O-CO-CH_2-Cl$ substituents | 90 |
| P-4 | $(-CH_2-CH\)_{60}(-CH_2-CH\)_{15}(-CH_2-C(CH_3)\)_{25}$ with $COOC_4H_9$, $COOC_2H_5$, and $CO-O-(CH_2)_2-O-SO_2$-phenyl substituents | 150 |
| P-5 | $(-CH_2-CH\)_{70}(-CH_2-CH\)_{30}$ with $COOC_2H_5$ and o-($CH_2-Cl$)-phenyl substituents | 117 |
| P-6 | $(-CH_2-CH\)_{60}(-CH_2-CH\)_{40}$ with $COO-C_8H_{17}$ and m-($CH_2-Cl$)-phenyl substituents | 105 |
| P-7 | $(-CH_2-C\)_{70}(-CH_2-CH\)_{30}$ with $CH_2-COOC_2H_5$, $COO-C_2H_5$, and $COO-CH_2-CH_2-O-CO-CH_2-Cl$ substituents | 173 |
| P-8 | $(-CH_2-CH\)_{65}(-CH_2-C(CH_3)\)_{35}$ with $COO-t-C_4H_9$ and $COO-CH_2-CH_2-O-CO$-(p-$CH_2-Cl$-phenyl) substituents | 146 |
| P-9 | $(-CH_2-CH\)_{63}(-CH_2-CH\)_{2}(-CH_2-CH\)_{35}$ with $COO-C_4H_9$, p-(CH-CH$_2$)-phenyl, and p-($CH_2Cl$)-phenyl substituents | 93 |

-continued

| | average particle size (nm) |
|---|---|
| P-10 (structure) | 130 |
| P-11 (structure) | 182 |
| P-12 (structure) | 118 |
| P-13 (structure) | 142 |

-continued
| | average particle size (nm) |
|---|---|
| P-14 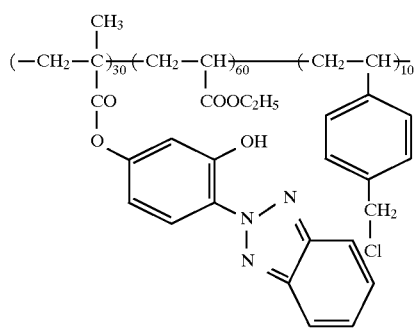 | 78 |
| P-15 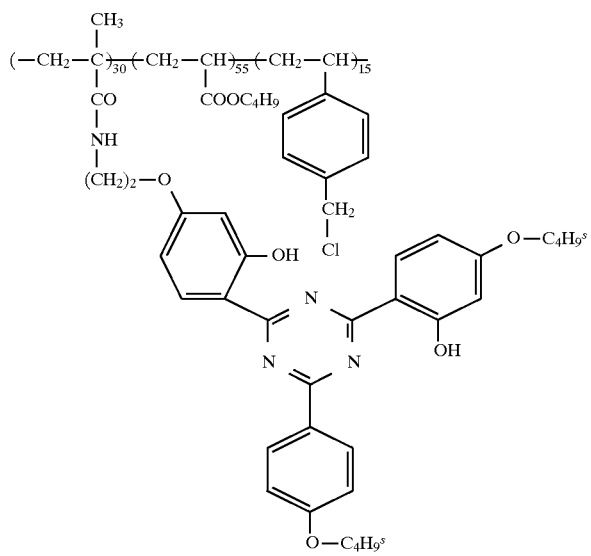 | 123 |
| P-16 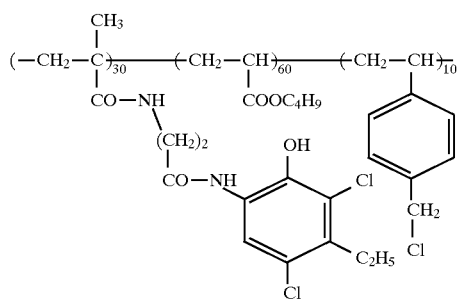 | 9 |
| P-17 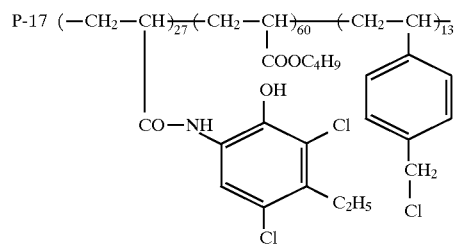 | 160 |

-continued
| | average particle size (nm) |
|---|---|
| P-18 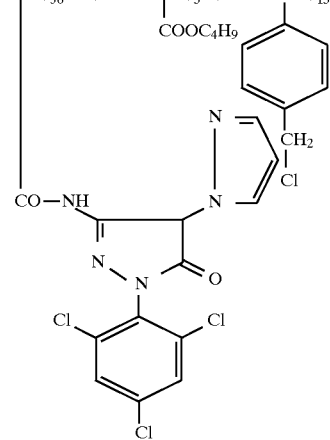 | 112 |
| P-19 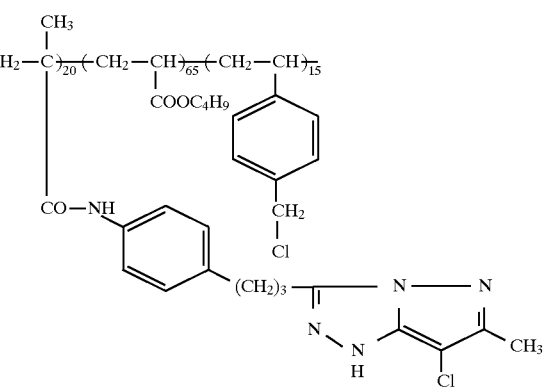 | 68 |
| P-20 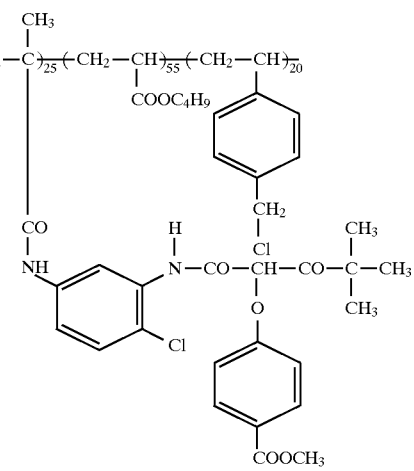 | 131 |

-continued

| | average particle size (nm) |
|---|---|
| P-21 (structure shown) | 110 |

The polymers according to the invention are used in the particular layer preferably in a quantity of 0.05 to 3 g/m², in particular in a quantity of 0.15 to 1 g/m². Their average particle size is preferably 50 to 200 nm.

The effects according to the invention are particularly distinct if the polymers according to the invention are used together in a silver halide emulsion layer which contains phenolic cyan couplers, in particular those of the formulae (III), (IV) and (V)

(III) structure (IV) structure (V) structure in which $R_1, R_2, R_7, R_8$ mutually independently mean $C_1$-$C_5$ alkyl, $R_3$ means hydrogen, $C_1$–$C_{12}$ alkyl, $R_4$ means hydrogen or a coupling-off group, $R_5$ means optionally substituted $C_1$–$C_4$ alkyl, optionally substituted phenyl, $R_6$ means hydrogen or $C_1$–$C_{12}$ alkyl $R_9$ means $C_2$ to $C_6$ alkyl $R_{10}$ means $C_{10}$–$C_{22}$ alkyl.

Suitable examples are:

C-1: $R_1$, $R_2$=—$C_5H_{11}$-t; $R_3$=—$C_4H_9$; $R_4$=H; $R_5$=—$C_3F_7$

C-2: $R_1$=—$NHSO_2$–$C_4H_9$; $R_2$=H; $R_3$=—$C_{12}H_{25}$; $R_4$=Cl; $R_5$=phenyl C-3: $R_1$, $R_2$=—$C_5H_{11}$-t; $R_3$=—$C_3H_7$-i; $R_4$=Cl; $R_5$=pentafluorophenyl C-4: $R_1$=—$C_5H_{11}$-t; $R_2$=Cl; $R_3$=—$C_6H_{13}$; $R_4$=Cl; $R_5$=2-chlorophenyl C-5: $R_9$=$CH_3$; $R_6$=—$C_2H_5$; $R_7$, $R_8$=—$C_5H_{11}$-t C-6: $R_9$=$CH_3$;$R_6$=H; $R_7$, $R_8$=—$C_5H_{11}$-t C-7: $R_9$, $R_6$=—$C_2H_5$; $R_7$, $R_8$=—$C_5H_{11}$-t C-8: $R_9$=—$C_2H_5$; $R_6$=—$C_4H_9$; $R_7$, $R_8$=—$C_5H_{11}$-t C-9: $R_9$=—$C_2H_5$; $R_6$=—$C_4H_9$; $R_7$, $R_8$=—$C_4H_9$-t C-10: $R_1$=—$C_4H_9$; $R_2$=H; $R_3$=CN; $R_4$=Cl

C-11: $R_1$=—$C_4H_9$; $R_2$=H; $R_3$=H; $R_4$=$SO_2CHF_2$

C-12: $R_9$=—$C_2H_5$; $R_6$=—$C_4H_9$; $R_7$, $R_8$=t-$C_4H_9$

C-13: $R_9$=$C_2H_5$; $R_{10}$=$C_{15}H_{31}$

Examples of colour photographic materials are colour negative films, colour reversal films, colour positive films, colour photographic paper and colour reversal photographic paper.

Photographic materials consist of a support onto which at least one photosensitive silver halide emulsion layer is applied. Suitable supports are in particular thin films and sheets. A review of support materials and of the auxiliary layers applied to the front and reverse thereof is given in Research Disclosure 37254, part 1 (1995), page 285.

Colour photographic materials conventionally contain at least one red-sensitive, one green-sensitive and one blue-sensitive silver halide emulsion layer optionally together with interlayers and protective layers.

Depending upon the nature of the photographic material, these layers may be differently arranged. This is described for the most important products:

Colour photographic films such as colour negative films and colour reversal films have on the support, in the stated sequence, 2 or 3 red-sensitive, cyan-coupling silver halide emulsion layers, 2 or 3 green-sensitive, magenta-coupling silver halide emulsion layers and 2 or 3 blue-sensitive yellow-coupling silver halide emulsion layers. The layers of identical spectral sensitivity differ with regard to their photographic sensitivity, wherein the lower sensitivity partial layers are generally arranged closer to the support than the higher sensitivity partial layers.

A yellow filter layer is conventionally arranged between the green-sensitive and blue-sensitive layers, which filter layer prevents blue light from penetrating the underlying layers.

Possible options for different layer arrangements and the effects thereof on photographic properties are described in J. Int. Rec. Mats., 1994, volume 22, pages 183–193.

Colour photographic paper, which is generally substantially less photosensitive than a colour photographic film, conventionally has on the support, in the stated sequence, one blue-sensitive, yellow-coupling silver halide emulsion layer, one green-sensitive, magenta-coupling silver halide emulsion layer and one red-sensitive, cyan-coupling silver halide emulsion layer; the yellow filter layer may be omitted.

The number and arrangement of the photosensitive layers may be varied in order to achieve specific results. For example, all high sensitivity layers may be grouped together in one package of layers and all low sensitivity layers may be grouped together in another package of layers in order to increase sensitivity (DE 2 530 645).

The substantial constituents of the photographic emulsion layers are binder, silver halide grains and colour couplers.

Details of suitable binders may be found in *Research Disclosure* 37254, part 2 (1995), page 286.

Details of suitable silver halide emulsions, the production, ripening, stabilisation and spectral sensitisation thereof, including suitable spectral sensitisers, may be found in *Research Disclosure* 37254, part 3 (1995), page 286 and in *Research Disclosure* 37038, part XV (1995), page 89.

Photographic materials with camera sensitivity conventionally contain silver bromide-iodide emulsions, which may optionally also contain small proportions of silver chloride. Photographic print materials contain either silver chloride-bromide emulsions containing up to 80 mol-% of AgBr or silver chloride-bromide emulsions containing more than 95 mol-% of AgCl.

Details relating to colour couplers may be found in *Research Disclosure* 37254, part 4 (1995), page 288 and in *Research Disclosure* 37038, part II (1995), page 80. The maximum absorption of the dyes formed from the couplers and the developer oxidation product is preferably within the following ranges: yellow coupler 430 to 460 nm, magenta coupler 540 to 560 nm, cyan coupler 630 to 700 nm.

In order to improve sensitivity, grain, sharpness and colour separation in colour photographic films, compounds are frequently used which, on reaction with the developer oxidation product, release photographically active compounds, for example DIR couplers which eliminate a development inhibitor.

Details relating to such compounds, in particular couplers, may be found in *Research Disclosure* 37254, part 5 (1995), page 290 and in *Research Disclosure* 37038, part XIV (1995), page 86.

Colour couplers, which are usually hydrophobic, as well as other hydrophobic constituents of the layers, are conventionally dissolved or dispersed in high-boiling organic solvents. These solutions or dispersions are then emulsified into an aqueous binder solution (conventionally a gelatine solution) and, once the layers have dried, are present as fine droplets (0.05 to 0.8 μm in diameter) in the layers.

Suitable high-boiling organic solvents, methods for the introduction thereof into the layers of a photographic material and further methods for introducing chemical compounds into photographic layers may be found in *Research Disclosure* 37254, part 6 (1995), page 292.

The non-photosensitive interlayers generally located between layers of different spectral sensitivity may contain agents which prevent an undesirable diffusion of developer oxidation products from one photosensitive layer into another photosensitive layer with a different spectral sensitisation.

Suitable compounds (white couplers, scavengers or DOP scavengers) may be found in *Research Disclosure* 37254, part 7 (1995), page 292 and in *Research Disclosure* 37038, part III (1995), page 84.

The photographic material may also contain UV light absorbing compounds, optical whiteners, spacers, filter dyes, formalin scavengers, light stabilisers, anti-oxidants, $D_{min}$ dyes, additives to improve stabilisation of dyes, couplers and whites and to reduce colour fogging, plasticisers (latices), biocides and others.

Suitable compounds may be found in *Research Disclosure* 37254, part 8 (1995), page 292 and in *Research Disclosure* 37038, parts IV, V, VI, VII, X, XI and XIII (1995), pages 84 et seq.

Conventionally, the layers of colour photographic materials are hardened, i.e. the binder used, preferably gelatine, is crosslinked by appropriate chemical methods.

Suitable hardener substances may be found in *Research Disclosure* 37254, part 9 (1995), page 294 and in *Research Disclosure* 37038, part XII (1995), page 86.

Once exposed with an image, colour photographic materials are processed using different processes depending upon their nature. Details relating to processing methods and the necessary chemicals are disclosed in *Research Disclosure* 37254, part 10 (1995), page 294 and in *Research Disclosure* 37038, parts XVI to XXIII (1995), pages 95 et seq. together with example materials.

The colour photographic material is preferably a colour negative paper, the silver halide emulsions of which contain at least 95 mol-% of AgCl.

EXAMPLES

Example 1

A colour photographic recording material suitable for rapid processing was produced by applying the following layers in the stated sequence onto a film support of paper coated on both sides with polyethylene. The stated quantities relate in each case to 1 m². The quantity of silver applied is stated as the corresponding quantity of $AgNO_3$.

Layer structure Sample 1
  Layer 1: (Substrate layer)
    0.2 g of gelatine
  Layer 2: (Blue-sensitive layer)
    Blue-sensitive silver halide emulsion (99.5 mol-% chloride,
    0.5 mol-% bromide, average grain diameter 0.8 μm) prepared from
    0.53 g of $AgNO_3$ with
    1.11 g of gelatine
    0.60 g of yellow coupler Y-1
    0.15 g of white coupler W-1
    0.06 g of coupler solvent OF-1
    0.24 g of tricresyl phosphate (TCP)
  Layer 3: (Protective layer)
    1.1 g of gelatine
    0.04 g of 2,5-di-tert.-octylhydroquinone
    0.04 g of compound SC-1
    0.04 g of TCP Layer 4: (Green-sensitive layer)
  Green-sensitised silver halide emulsion (99.5 mol-% chloride,
  0.5 mol-% bromide, average grain diameter 0.6 μm) prepared from
  0.25 g of AgNO$_3$ with
  0.95 g of gelatine
  0.20 g of magenta coupler M-1
  0.20 g of dye stabiliser ST-1
  0.10 g of dye stabiliser ST-2
  0.18 g of coupler solvent OF-2
  0.12 g of coupler solvent OF-3
Layer 5: (UV protective layer)
  0.75 g of gelatine
  0.2 g of UV absorber UV-1
  0.1 g of UV absorber UV-2
  0.025 g of 2,5-di-tert.-octylhydroquinone
  0.02 g of compound SC-1
  0.1 g of coupler solvent OF-4
  0.04 g of TCP
Layer 6: (Red-sensitive layer)
  Red-sensitised silver halide emulsion (99.5 mol-% chloride,
  0.5 mol-% bromide, average grain diameter 0.5 μm) prepared from
  0.30 g of AgNO$_3$ with
  0.75 g of gelatine
  0.36 g of cyan coupler C-12
  0.36 g of TCP
Layer 7: (UV protective layer)
  0.85 g of gelatine
  0.36 g of UV absorber UV-1
  0.18 g of UV absorber UV-2
  0.18 g of coupler solvent OF-4
Layer 8: (Protective layer)
  0.9 g of gelatine
  0.3 g of hardener H-1

The following compounds were used in the samples of example 1:

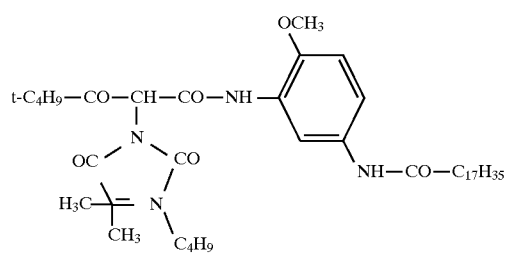
Y-1

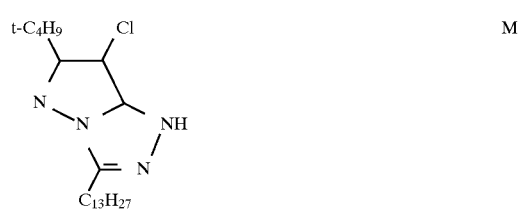
M-1

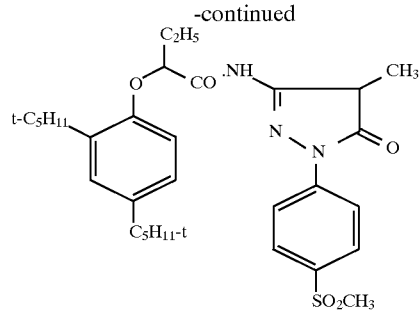
W-1

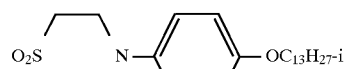
ST-1

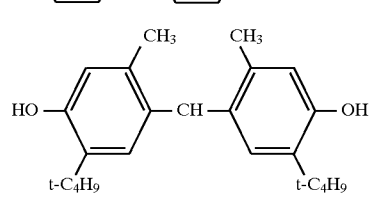
ST-2

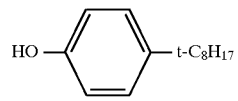
OF-1

C$_4$H$_9$O—CO—(CH$_2$)$_4$—CO—OC$_4$H$_9$   OF-2
C$_{14}$H$_{29}$—OH/C$_{12}$H$_{25}$—OH(1:3)   OF-3
i-H$_{19}$C$_9$OCO—(CH$_2$)$_4$—COOC$_9$H$_{19}$-i   OF-4

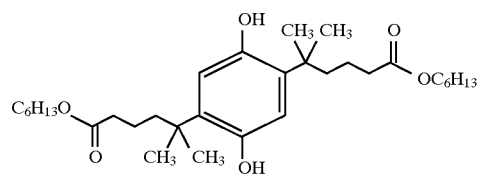
SC-1

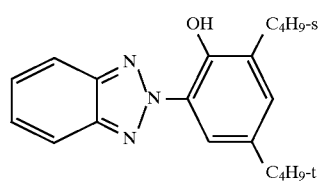
UV-1

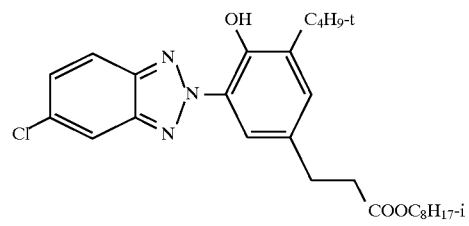
UV-2

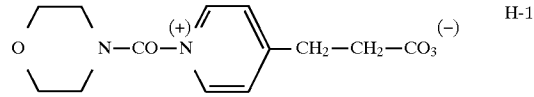
H-1

Samples 2 to 15

Samples 2 to 15 were produced in the same manner as sample 1, with the difference that a polymer according to the invention was additionally added to layer 6. Polymers VP-1 and VP-2, not according to the invention, were used as a comparison.

The results are shown in table 1.

The samples are then exposed behind a graduated grey wedge through a U 449 filter and are then processed as follows:

a) Colour developer-45 s-35° C.
   Tetraethylene glycol 20.0 g
   N,N-diethylhydroxylamine 4.0 g
   (N-ethyl-N-(2-methanesulphonamido)ethyl)-4-amino-3-methylbenzene sesquisulphate 5.0 g
   Potassium sulphite 0.2 g
   Potassium carbonate 30.0 g
   Polymaleic anhydride 2.5 g
   Hydroxyethanediphosphonic acid 0.2 g
   Optical whitener (4,4'-diaminostilbenesulphonic acid derivative) 2.0 g
   Potassium bromide 0.02 g
   make up to 1000 ml with water; adjust pH to 10.2 with KOH or $H_2SO_4$.

b) Bleach/fixing bath-45 s-35° C.
   Ammonium thiosulphate 75.0 g
   Sodium hydrogen sulphite 13.5 g
   Ethylenediaminetetraacetic acid (iron/ammonium salt) 45.0 g
   make up to 1000 ml with water, adjust pH to 6.0 with ammonia (25 wt. %) or acetic acid.

c) Rinsing-2 min-33° C.

d) Drying

The minimum ($D_{min}$) and maximum ($D_{max}$) cyan densities of the samples were measured. The samples were then stored in the dark for 84 days at 80° C. and 50% relative humidity and the percentage decrease in maximum density ($\Delta D_{max}$) determined. The samples were also exposed with 20–10$^6$ luxh of light from a daylight-standardised xenon lamp and the percentage decrease in density determined relative to a starting density of 1.0 ($\Delta D_{1.0}$). All values are stated in table 1.

Quantities are stated in g/m$^2$

As is shown by table 1, the added polymers reduce the decrease in density on storage in the dark, without impairing other important properties such as light stability, minimum and maximum density.

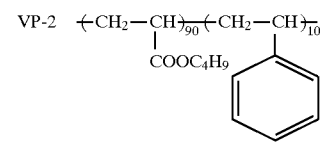

|  |  | average particle size |
|---|---|---|
| VP-1 | ethyl acrylate | 90 nm |
| VP-2 | (structure shown above) | 114 nm |

TABLE 1

| Sample | Added polymer | Quantity | Gelatine | $D_{min}$ | $D_{max}$ | $\Delta D_{max}$ | $\Delta D_{1.0}$ |
|---|---|---|---|---|---|---|---|
| 1 Comparison | none | 0 | 0.75 | 0.119 | 2.61 | 27 | 45 |
| 2 Comparison | none | 0 | 0.88 | 0.118 | 2.6 | 26 | 44 |
| 3 Invention | P-1 | 0.36 | 0.88 | 0.117 | 2.63 | 14 | 43 |
| 4 Invention | P-2 | 0.36 | 0.88 | 0.118 | 2.6 | 12 | 43 |
| 5 Invention | P-2 | 0.3 | 0.8 | 0.119 | 2.63 | 14 | 46 |
| 6 Invention | P-6 | 0.32 | 0.83 | 0.116 | 2.65 | 13 | 44 |
| 7 Invention | P-9 | 0.32 | 0.83 | 0.118 | 2.64 | 13 | 42 |
| 8 Invention | P-3 | 0.32 | 0.83 | 0.119 | 2.64 | 15 | 42 |
| 9 Invention | P-1 | 0.3 | 0.8 | 0.117 | 2.6 | 14 | 45 |
| 10 Invention | P-1 | 0.4 | 0.94 | 0.119 | 2.65 | 16 | 45 |
| 11 Invention | P-1 | 0.3 | 0.83 | 0.116 | 2.61 | 15 | 43 |
| 12 Invention | P-14 | 0.32 | 0.83 | 0.116 | 2.62 | 17 | 42 |
| 13 Invention | P-21 | 0.32 | 0.83 | 0.118 | 2.65 | 18 | 41 |
| 14 Comparison | VP-1 | 0.32 | 0.83 | 0.118 | 2.63 | 24 | 44 |
| 15 Comparison | VP-2 | 0.36 | 0.88 | 0.119 | 2.61 | 23 | 43 |

Example 2

Samples 16 to 24 were produced in the same manner as sample 1, with the difference that a coupler solvent other than the coupler solvent TCP was used and a polymer according to the invention was added.

Table 2 shows the results.

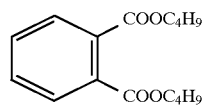

As is shown by table 2, the added polymers reduce the decrease in density on storage in the dark irrespective of the coupler solvent used.

TABLE 2

| Sample | Added polymer | Quantity | Gelatine | Coupler solvent | $D_{min}$ | $D_{max}$ | $\Delta D_{max}$ | $\Delta D_{1.0}$ |
|---|---|---|---|---|---|---|---|---|
| 1 Comparison | none | 0 | 0.75 | TCP | 0.119 | 2.61 | 27 | 45 |
| 2 Comparison | none | 0 | 0.88 | TCP | 0.118 | 2.6 | 26 | 44 |
| 16 Invention | P-1 | 0.36 | 0.88 | OF-4 | 0.118 | 2.64 | 13 | 44 |
| 17 Invention | P-2 | 0.36 | 0.88 | OF-2 | 0.116 | 2.63 | 12 | 45 |
| 18 Invention | P-2 | 0.36 | 0.88 | OF-4 | 0.117 | 2.63 | 12 | 42 |
| 19 Invention | P-2 | 0.36 | 0.88 | OF-5 | 0.116 | 2.65 | 14 | 43 |
| 20 Invention | P-2 | 0.36 | 0.88 | TCP | 0.118 | 2.62 | 16 | 43 |
| 21 Invention | P-9 | 0.32 | 0.83 | OF-2 | 0.119 | 2.65 | 13 | 42 |
| 22 Invention | P-9 | 0.32 | 0.83 | OF-4 | 0.118 | 2.64 | 15 | 44 |
| 23 Invention | P-9 | 0.32 | 0.83 | OF-5 | 0.116 | 2.62 | 13 | 45 |
| 24 Invention | P-1 | 0.3 | 0.83 | OF-5 | 0.117 | 2.63 | 14 | 43 |

I claim:

1. A color photographic material which comprises a support and at least one spectrally sensitized silver halide emulsion layer containing at least one color coupler, said silver halide emulsion layer contains a polymer in dispersed form with an average particle size of <300 nm with repeat units of the structure I

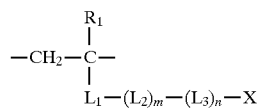

in which $R_1$ denotes hydrogen, alkyl or haloge $L_1$ denotes —CONH—, —CO— or a phenylene group, n, $L_2$ denotes an alkylene group with 1 to 20 C-atoms or an arylene group with 6 to 20 atoms, $L_3$ denotes —OCO—, —CONH—, —NHCO—, —SO$_2$NH—, —NHSO$_2$—, —SO$_2$— or —O—, m is 0 or 1 and n in the event that m is 0, also means 0, otherwise 1, X is a group which reacts with —NH$_2$—, —COOH— or —OH— in an addition or condensation reaction.

2. A color photographic material according to claim 1, wherein

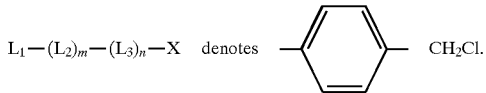

* * * * *